United States Patent
Greubel et al.

(10) Patent No.: US 6,416,135 B1
(45) Date of Patent: Jul. 9, 2002

(54) MEANS AND METHOD FOR ATTACHING FRP WHEELS

(75) Inventors: William A. Greubel, Newburgh; Charles M. Scarton, Evansville, both of IN (US)

(73) Assignee: Accuride Corporation, Evansville, IN (US)

(*) Notice: Subject to any disclaimer, the term of this patent is extended or adjusted under 35 U.S.C. 154(b) by 0 days.

(21) Appl. No.: 09/608,795

(22) Filed: Jun. 30, 2000

(51) Int. Cl.⁷ .............................................. B60B 5/02
(52) U.S. Cl. ........................... 301/64.702; 301/35.625
(58) Field of Search ......................... 301/64.701, 64.702, 301/64.703, 35.621, 35.625

(56) References Cited

U.S. PATENT DOCUMENTS

| | | | | |
|---|---|---|---|---|
| 3,811,737 A | * | 5/1974 | Lejeune ................. | 301/64.703 |
| 4,072,358 A | * | 2/1978 | Ridha ...................... | 301/64.703 |
| 4,376,606 A | * | 3/1983 | Peterson ................ | 301/64.703 |
| 4,532,097 A | * | 7/1985 | Daniels et al. ......... | 301/64.703 |
| 4,749,235 A | * | 6/1988 | McDougall ............ | 301/64.703 |
| 4,930,843 A | * | 6/1990 | Lewis .................... | 301/64.703 |
| 5,022,712 A | * | 6/1991 | Woefel et al. .......... | 301/64.703 |
| 5,282,673 A | * | 2/1994 | Koyama et al. ........ | 301/64.702 |
| 5,368,371 A | * | 11/1994 | Markling ............... | 301/64.701 |
| 5,401,079 A | * | 3/1995 | Rooney .................. | 301/64.703 |
| 5,564,793 A | * | 10/1996 | Whiteford .............. | 301/64.703 |

* cited by examiner

Primary Examiner—S. Joseph Morano
Assistant Examiner—Long Bao Nguyen
(74) Attorney, Agent, or Firm—Kilgannon & Steidl

(57) ABSTRACT

A method of forming a hole to a final specified dimension in a fiber reinforced wheel for a motor vehicle, and a fiber reinforced wheel with such a hole. Stud mounting holes, or a hub hole or a valve hole, are drilled through the wheel to an internal dimension larger than the final specified dimension, to sever and expose fiber ends in the wheel surrounding the hole. Thermoset resin with coupling and curing agents is applied to the hole internal surfaces by brushing or spraying, and is thereafter cured, and atomically and mechanically bonded to the internal hole surfaces with exposed fiber ends to form a thin smooth permanent protective layer on the hole internal surfaces defining the hole at final specified dimension. The hole may have frustoconical, spherical radius, and/or cylindrical portions. At least when the hole has frustoconical or spherical portions, a molding member having a shape corresponding to the hole shape and dimensioned according to the hole specified dimension is inserted into the hole after the thermoset resin is applied into the hole, and is removed after the curing and bonding.

18 Claims, 3 Drawing Sheets

MEANS AND METHOD FOR ATTACHING FRP WHEELS

FIELD OF THE INVENTION

The present invention relates to fiber reinforced plastic wheels (commonly known as FRP wheels) for passenger and commercial transportation motor vehicles. More particularly, the invention relates to a means and method for attaching such FRP wheels to the mounting plates on such vehicles.

BACKGROUND OF THE INVENTION

An FRP wheel is a known type of wheel for motor vehicles, and is formed by molding a one-piece wheel out of fiber reinforced plastic. The RFP wheel is in turn attached to the motor vehicle mounting plate by a plurality of attachment studs, each of which passes through the mounting plate and a hole through the wheel disc, and a plurality of mounting nuts, each of which is torqued on to the end of an attachment stud. In a common method of production of an FRP wheel, the wheel is initially molded with no holes for the attachment studs, the holes thereafter being drilled or machined into the wheel disc.

One of the difficulties with the preceding method of construction and attachment is that the drilling of the wheel disc holes causes reinforcing plastic fibers in the disc to be severed and exposed at the internal circumferential surfaces of the holes defining the holes passing through the discs. These exposed and severed fibers allow for intrusion of environmental liquids and vapors along the fiber/resin interfaces surrounding the holes, which in turn causes degradation of the FRP wheels in the internal areas adjacent to the holes. A further difficulty associated with this method of construction and attachment is that the severed and exposed fibers surrounding the holes increase the sliding friction between cone seating mounting nuts and the frustoconical hole surfaces laterally adjacent where frustoconical portions of the mounting nuts extend into the holes upon tightening. The sliding friction also may increase between the hole surfaces and the attachment studs passing through the holes. As is known, such increases in sliding friction result in lower clamping forces holding the wheel onto the mounting plate, particularly at high temperatures.

Various methods have been attempted to either protect the hole surfaces and/or provide acceptable clamping forces to hold the wheel onto the mounting plate, both results of course being highly desirable to obtain a safe, long lasting and properly functioning wheel mounting. Such prior art methods have variously included at least the following: (1) molding or fitting metal or plastic or FRP inserts or sleeves into the disc to provide the surfaces surrounding the mounting holes; (2) attempting to control the distribution and orientation of reinforcing fibers, particularly in the areas adjacent where the holes are drilled into the wheel; (3) casting the wheel holes directly into the wheel during the molding of the FRP wheel, including the use of an FRP composition that is highly resistant to creep; and (4) applying an antiseize lubricant paste onto the frustoconical hole seating surfaces for the cone seating nuts prior to assembly of the nuts. The first method is costly, and in some instances may cause casting problems and cracking in the wheel. The second method does not solve the above-noted problems associated with severed and exposed fibers at the surfaces surrounding the bolt holes. The third method results in uneven distribution and orientation of the reinforcing fibers adjacent the holes during casting of the wheels, and cracking in unreinforced areas. The fourth method presumable results in a decrease in sliding friction and may partially (i.e., at the frustoconical seating surfaces) protect the exposed fibers from environmental exposure, but only temporarily since the antiseize lubricant is not mechanically or chemically attached and can be removed during application of the mounting nuts, maintenance and cleaning, exposure to the environment, and continued wear and abrasion from all surfaces that come into contact with the antiseize lubricant. Once the antiseize paste is removed, the fibers will again be exposed to the environment around the holes and further there will be no means present to reduce friction in the subsequent reattachments of the wheel to the mounting plate.

It will accordingly be seen that the mounting holes in FRP wheels have presented the above noted long-standing problems that to date have not been adequately solved.

Prior art representing the above prior methods may be found for example within U.S. Pat. Nos. 3,309,843; 3,811,737; 3,870,372; 4,294,490; 4,294,639; 4,489,184; 4,569,957; 5,022,712; 5,123,711; 5,234,259; 5,277,479; 5,401,079; and Japanese Patent Application 02-128958.

SUMMARY OF THE INVENTION

The present invention is intended to overcome the deficiencies of the above-noted prior art. A vehicle wheel is disclosed wherein the holes in the wheel disc are drilled or machined after the one-piece wheel has been molded out of fiber reinforced plastic. The holes may include frustoconical seating surfaces for cone seating nuts, spherical seating surfaces for nuts with a spherical radius, or the holes may be cylindrical through the disc in which event flange nuts are used for mounting. Following the forming of the holes, which initially have severed and exposed fibers at the surfaces surrounding the holes, a thin and smooth protective coating of a thermoset resin is permanently created on all the internal surfaces surrounding the holes all the way from the outboard side of the disc to the mounting plate side of the disc. This is accomplished by first applying onto these surfaces a layer of a mixture of thermoset resin and curing and coupling agents. In the case of frustoconical and spherical seating surfaces, a molding plug matching the shape and final specified dimensions of each hole, from one disc side to the other, is inserted into each hole and positioned to mold the thermoset resin layer between the plug outer surface(s) and the circumferential surfaces(s) defining the hole to the final specified dimensions of the hole. The mold plug has a centering portion so that the plug mating surfaces are concentric with the hold. As the plug is inserted, it pushes excess resin mixture out the other end of the hole and also into the interstices between the fibers and resin in the wheel adjacent the hole. A curing operation is then carried out to cure the thermoset resin to its final condition and dimensions (s). The resin mixture atomically and mechanically bonds with the exposed and severed hole fibers and the wheel resin adjacent the hole. The mold plug is then removed. The exposed fibers surrounding each hole from one disc side to the other accordingly are covered by a permanent protective, thin and smooth, layer of cured thermoset resin. The fibers surrounding each hole accordingly are not subject to environmental liquids and vapors, and thus there is no intrusion along fiber interfaces anywhere along the hole to degrade the wheel adjacent the holes. In the case of a fully cylindrical hole through the disc, the mold plug may not be needed.

The method of the present invention results in a permanent layer that is not removed during exposure to the environment, and that is strong enough so as not to be removed by continued wear and abrasion by the attachment nuts. Likewise, there will not be excessive sliding friction during reattachment of the wheels. Generally, the permanently cured layer will be thick enough to remain intact under the aforementioned environmental, wear and abrasion influences, but thin enough not to cause degradation in long-term clamping force from creep. A thickness of 0.001 inches, for example, is thought to be appropriate to meet these criteria. The resin should be selected to cure to a smooth (i.e., low coefficient of friction) condition, allow removal of the hole plug after curing, and be compatible with the wheel FRP material adjacent to the holes.

The present invention is also applicable to dual wheels mounted to the same mounting plate wherein the attachment studs pass from the mounting plate through the discs of each of the dual wheels before the mounting nuts are attached. Furthermore the same method may be used to form permanent coatings on other holes having exposed and severed fibers in the FRP disc or rim, for example valve holes, center hub holes or other holes drilled or machined into the disc face to reduce weight, add styling features or serve some other design purpose.

Other features and advantages of the present invention will be apparent from the following description, drawings and claims.

DETAILED DESCRIPTION OF EMBODIMENTS

Figure 1:
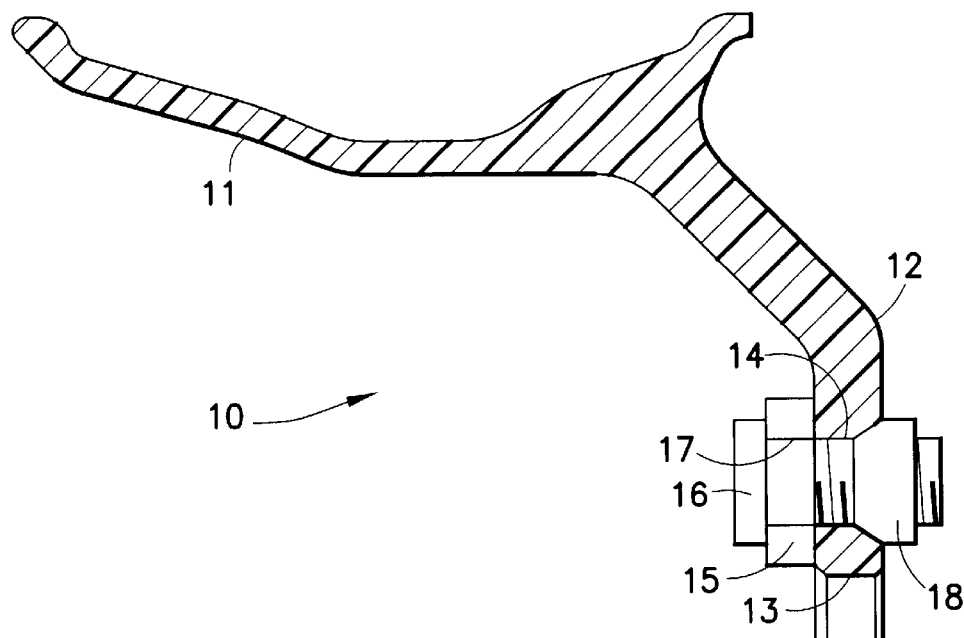
FIG. 1 is a side cross sectional view of an FRP wheel illustrating generally the position of the mounting nuts and attachment studs passing through the mounting plate and holes in the wheel disc.
Figure 1:
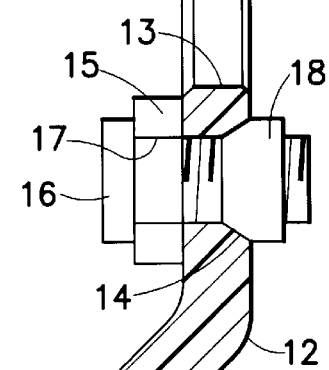
Figure 1:
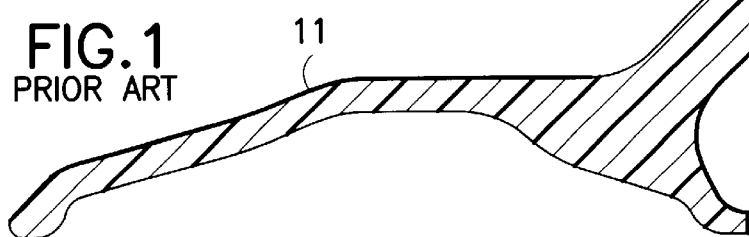
Figure 2:
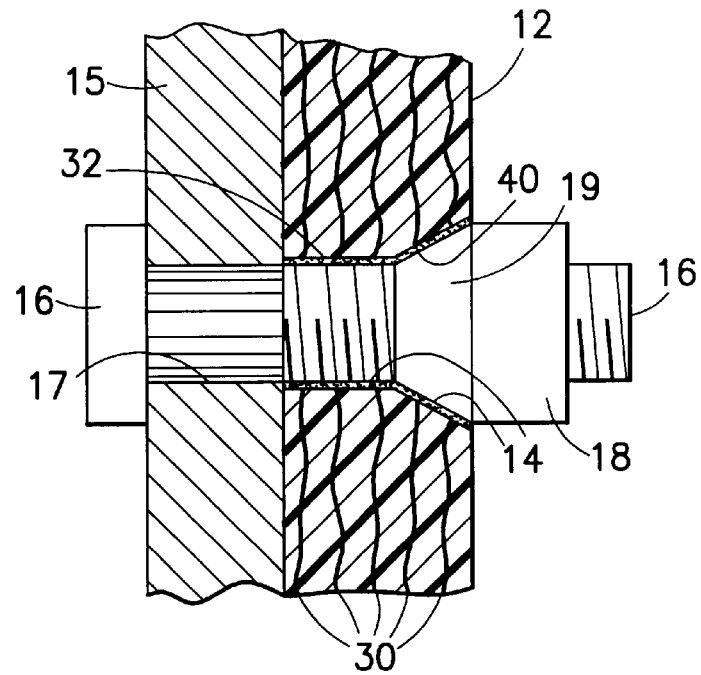
FIG. 2 is an enlarged fragmentary sectional view of a disc mounting hole, mounting plate, attachment stud, and cone seating mounting nut, and illustrating the product of the present invention.
Figure 3:
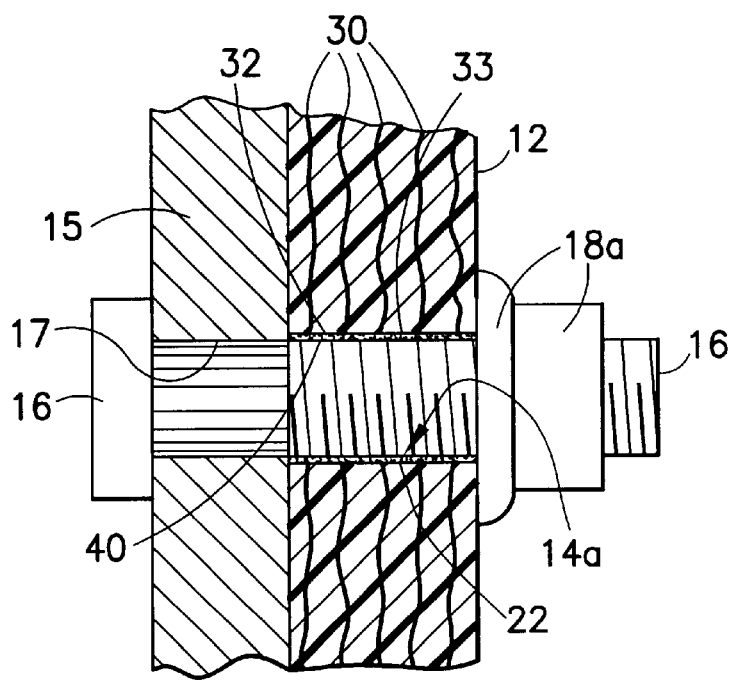
FIG. 3 is an enlarged fragmentary sectional view of an alternative disc mounting hole, mounting plate, attachment stud and flange mounting nut, and illustrating the product of the present invention.

Referring to FIG. 1, a one-piece FRP wheel 10 is shown in cross section having rim 11, disc 12 and center hub hole 13. A plurality of mounting holes 14 extend through disc 12 from one side to the other and are arranged in uniform fashion about hub hole 13. The disc 12 is attached to mounting plate or hub 15 on the motor vehicle by a plurality of attachment studs 16 that pass through holes 17 in the mounting plate 15 and the mounting holes 14 in the disc. The outer surface of studs 16 are spaced from the walls of mounting holes 14 in known fashion. Mounting nuts 18 are then torqued onto the threaded ends of the attachment studs 16. The mounting nuts 18 may for example be in the form of cone seating nuts as shown in FIGS. 1 and 2, or in the form of flange nuts 18a as shown in FIG. 3. Nuts having a spherical radius rather than a frustoconical surface may also be used. Disc mounting holes 14 in FIGS. 1, 2, 4 and 5 will match the configuration of the attachment stud 16 and the frustoconical portion 19 of mounting nut 18, each disc mounting hole accordingly having a frustoconical portion 20 and a cylindrical portion 21. If the nut has a spherical radius, each disc hole will likewise have a portion corresponding to portion 20 but with a spherical radius. Disc mounting holes 14a in FIG. 3 will match the configuration of the attachment stud 16, each hole accordingly being a cylinder 22 throughout. It will be appreciated by those skilled in the art that the attachment studs 16 emerging from mounting plate 15 may also pass through mounting holes in a brake drum before passing through the disc mounting holes 14 or 14a.

The FRP wheel 10 for use in the present invention is generally formed by being molded out of fiber reinforced plastic resins by known techniques and from known materials. The wheel disc 12 as molded is continuous from rim to rim, and center hub hole 13 and mounting holes 14 or 14a are subsequently drilled or machined into disc 12 from one disc side through to the other.

Figure 4:
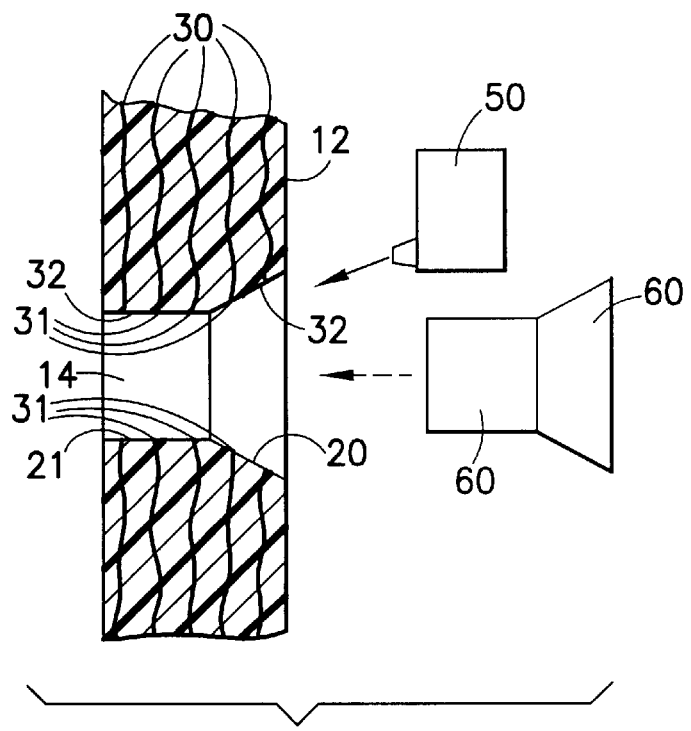
FIG. 4 is a view the disc mounting hole of FIG. 2 after it has been drilled or machined and prior to further steps of the method of the present invention being carried out.

Referring to FIG. 4 illustrating a typical disc mounting hole 14 after drilling and machining, fibers 30 in fiber reinforced plastic disc 12 are shown substantially immersed in resin with the fiber ends 31 severed and exposed at the interior surrounding edge surface 32 defining hole 14 from one side of the disc 12 to the other. The same circumstance will exist after mounting holes 14a of the FIG. 3 configuration (for flange nuts 18a) are drilled. Accordingly, if further steps are not taken before the studs 16 and cone seating nuts 18 are applied to disc 12, the severed and exposed fiber ends 31 will allow for intrusion of liquids and vapors along the interfaces of the fibers 30 and the resin of the disc at the interior edge surfaces 32 of holes 14 to cause degradation of the wheel disc in the disc areas adjacent the holes 14. Likewise, as opposed to smooth-sided holes, the severed and exposed fiber ends 31 will increase the sliding friction of the hole in relation to the frustoconical portion 19 of nut 18 and stud 16 as they are applied, to result in lower than desired clamping forces holding the wheel, particularly at high temperatures. The same environmental intrusion and increased sliding friction problems will likewise exist due to the severed and exposed fiber ends at holes 14a in the FIG. 3 configuration if no further steps are taken prior to the mounting of disc 12.

Figure 5:
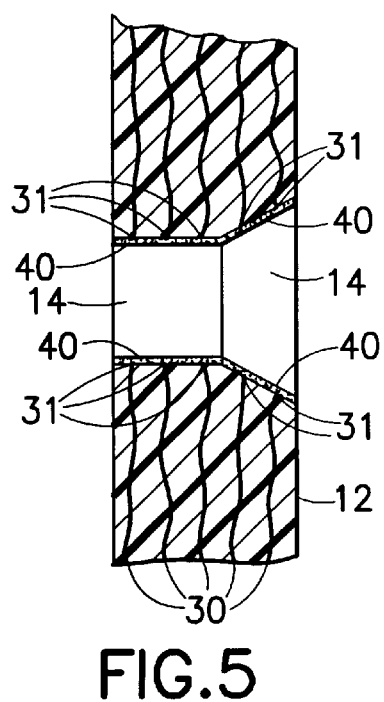
FIG. 5 is a view of the disc mounting hole of FIG. 2 after the method of the present invention has been carried out.

According to the method of the present invention, to overcome the aforementioned problems, a thin, smooth protective layer 40 of a thermoset resin is permanently established on the interior cylindrical edge surface 32 of frustoconical portion 20 and cylindrical portion 21 surrounding the hole 14 beginning at one side of the disc and extending all the way through to the other side of the disc. Likewise, an identical layer 40 is permanently established on the edge surface 33 of cylindrical hole 14a from one side of the disc to the other. The finished layer 40, as shown particularly in FIG. 5, is of the order of 0.001, and possibly 0.0005 to 0.002 or so, inches thick so that layer 40 will be thick enough to remain intact under continuous use and exposure to environmental, wear and abrasion influences, and yet thin enough so as to allow all applied loads to be easily transferred to the mating wheel hole, and stud and/or cone nut frustoconical, seating surfaces. Thus, there will not be degradation in long term clamping forces from creep in layer 40.

The thermoset resin used in layer 40 may be the same high temperature resin used to mold the FRP wheel. The thermoset resin may be a vinyl ester thermoset resin with high temperature additives, for example NOVOLAK epoxy vinyl ester thermoset resin with DVB. The thermoset resin will not have any significant creep, even at temperatures of 300° F., when high temperature additives are used. Permanent layer 40 is atomically bonded by a combination of light ionic and covalent bonds to the base thermoset resin of the wheel at the holes 14, 14a and is strongly mechanically bonded to the initially exposed and severed fiber ends 31 at the holes 14, 14a. To assure the bonding, a specific coupling agent such as silane, for example, is added to the thermoset resin. A curing agent may also be added to the thermoset resin to obtain the curing of layer 40 as described below. Common curing agents for two-part epoxy thermoset resin systems include aliphatic amines, aromatic amines, polyamides, etc.

To obtain the permanent, thin, smooth protective layer 40 in the present invention, the thermoset resin to form the layer is first mixed with a curing agent and a coupling agent as desired. Referring to FIG. 4, illustrating the hole 14 after drilling and machining and with the exposed and severed fiber ends 31, the thermoset resin mixture is then sprayed in sufficient quantity by sprayer 50 (or alternatively brushed or extruded for example) onto the entire hole 14 interior surfaces 32 surrounding cylindrical portion 21 and frustoconical portion 20 from one end of the hole 14 to the other. When part of hole 14 is a seating surface for cone or spherical nuts, as in FIG. 4, a steel plug 60 of conforming shape to the hole is then inserted into the hole to act as a mold. Cylindrical shaft 60a of plug 60 acts to center the plug to make its mating surfaces concentric with the hole. The plug surface dimensions are those specified for the final hole dimension. The plug upon insertion forces excess thermoset resin mixture out of the hole and also into the interfaces between the exposed fibers 31 and resin surrounding the hole. The thermoset resin layer 40 is then cured by the curing agents and perhaps by heating, and the plug 60 thereafter is removed to leave smooth permanent layer 40 of FIG. 5 and all the aforementioned desirable results of the present invention. The same method is utilized for the holes 14a of FIG. 3, except that the plug will then be cylindrical to match the cylindrical hole 14a from one end to the other. Or, the plug may be eliminated in the case of cylindrical holes 14a. As finally formed in either case, the inner circumference of the protective layer 40 is obtained to match the final specified dimensions of the hole 14 or 14a. All of the severed and exposed fiber ends 31 are covered by the bonded smooth protective permanent layer 40.

While the figures of the drawings and the above discussion are specifically referenced to single wheel mountings, it will be understood that the method of the invention is equally applicable to the mounting holes of dual FRP wheels, as well as rim valve holes and disc center hub holes and styling holes in FRP wheels wherein the holes are initially drilled and/or machined to leave exposed and severed fiber ends surrounding the holes. Further, while FIG. 2 shows a frustoconical hole portion 20 on only one side of the disc, it will be appreciated that in heavy truck wheels, wherein the nuts may be installed from either side of the disc, a frustoconical hole portion may be on both sides of the disc at the opposite entrances to each hole. The invention is carried out in the same manner except that a two-piece conforming plug will be required to insert and fill up the hole from both sides and thereafter be removed upon curing of the protective layer.

It will be appreciated by persons skilled in the art that variations and/or modifications may be made to the invention without departing from the spirit and scope of the invention. The present embodiments are, therefore, to be considered as illustrative and not restrictive.

What is claimed is:

1. A method of forming a hole to a final specified dimension in a fiber reinforced plastic wheel for a motor vehicle, said wheel having a disc and a rim, comprising: initially forming a hole through a portion of the wheel to an internal dimension larger than the final specified hole dimension, including severing and exposing fiber ends along the internal wheel surfaces surrounding the hole during said initial forming; applying a mixture of thermoset resin and coupling and curing agents to said wheel internal surfaces surrounding the hole; curing the thermoset resin mixture on the internal hole surfaces, and atomically and mechanically bonding said resin mixture to the internal hole surfaces, to form a thin smooth permanent protective layer on the hole internal surfaces, said layer then defining the hole at its final specified dimension.

2. A method of forming a hole to a final specified dimension in a fiber reinforced plastic wheel for a motor vehicle, said wheel having a disc and a rim, comprising: initially forming a hole through a portion of the wheel to an internal dimension larger than the final specified hole dimension, including severing and exposing fiber ends along the internal wheel surfaces surrounding the hole during said initial forming; applying a mixture of thermoset resin and coupling and curing agents to said wheel internal surfaces surrounding the hole; inserting a molding member into the hole including pushing excess thermoset resin mixture out of the hole as the molding member is inserted, said molding member having a shape corresponding to the hole shape and having an external dimension essentially equal to the hole final specified opening dimension; curing the thermoset resin mixture between the molding member and the internal hole surfaces, and atomically and mechanically bonding said resin mixture to the internal hole surfaces, to form a thin smooth permanent protective layer on the hole internal surfaces, said layer then defining the hole at its final specified dimension; and, removing the molding member from the hole.

3. The method of claim 1 or claim 2, wherein the said wheel hole is a stud mounting hole in the wheel disc.

4. The method of claim 1 or claim 2, wherein the said wheel hole is a center hub hole in the wheel disc.

5. The method of claim 1 or claim 2, wherein the said wheel hole is a valve hole in the wheel rim.

6. The method of claim 1 or claim 2, wherein the mounting hole has a cylindrical portion and a frustoconical portion.

7. The method of claim 1 or claim 2, wherein the mounting hole has a cylindrical portion and a portion with a spherical radius.

8. The method of claim 2, wherein the said hole is a stud mounting hole in the wheel disc, the mounting hole has a cylindrical portion and a frustoconical portion, and the molding member has a conforming cylindrical portion and a conforming frustoconical portion.

9. The method of claim 1 or claim 2, wherein the thermoset resin mixture is sprayed onto the wheel internal surfaces surrounding the hole.

10. The method of claim 1 or claim 2, wherein the thermoset resin mixture is brushed onto the wheel internal surfaces surrounding the hole.

11. A fiber reinforced plastic wheel for a motor vehicle, said wheel having a rim, a disc, and at least one hole extending through the wheel, said wheel having thermoset resin, fibers embedded therein, and severed fiber ends in areas surrounding and adjacent the hole, said hole having a specified circumferential dimension and being defined by a thin smooth permanent protective layer of cured thermoset resin atomically and mechanically bonded to the wheel thermoset resin and severed fiber ends surrounding and adjacent the hole, and said layer extending from one end of the hole to the other end.

12. The invention of claim 11, wherein the at least one hole is a stud mounting hole in the wheel disc.

13. The invention of claim 11, wherein the at least one hole is a center hub hole in the wheel disc.

14. The wheel of claim 11, wherein the at least one hole is a valve hole in the wheel rim.

15. The wheel of claim 11, wherein the at least one stud mounting hole has a cylindrical portion and a frustoconical portion.

16. The wheel of claim 11, wherein the at least one stud mounting hole has a cylindrical portion and a portion with a spherical radius.

17. The method of claim 1 or claim 2, wherein the hole is initially formed by drilling.

18. The method of claim 1 or claim 2, wherein the hole is initially formed by machining.

* * * * *